(12) United States Patent
Zhao et al.

(10) Patent No.: US 8,208,927 B2
(45) Date of Patent: *Jun. 26, 2012

(54) METHOD OF SYSTEM ACCESS TO A WIRELESS NETWORK

(75) Inventors: Wen Zhao, Kanata (CA); Xin Jin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,252

(22) Filed: Jul. 7, 2011

(65) Prior Publication Data

US 2011/0269501 A1 Nov. 3, 2011

Related U.S. Application Data

(63) Continuation of application No. 12/715,001, filed on Mar. 1, 2010, now Pat. No. 7,995,530, which is a continuation of application No. 11/607,578, filed on Dec. 1, 2006, now Pat. No. 7,702,335, which is a continuation of application No. 10/498,025, filed as application No. PCT/CA02/01944 on Dec. 6, 2002, now Pat. No. 7,162,242.

(60) Provisional application No. 60/336,687, filed on Dec. 7, 2001.

(51) Int. Cl.
*H04B 1/26* (2006.01)
*H04W 36/00* (2009.01)

(52) U.S. Cl. ........................................ 455/437; 455/329

(58) Field of Classification Search .................. 455/453, 455/437, 450, 423, 7, 525, 435.2, 434, 513, 455/407; 370/342, 329, 335, 338, 328, 312, 216; 375/133, 132

See application file for complete search history.

(56) References Cited

U.S. PATENT DOCUMENTS 5,345,596 A 9/1994 Buchenhorner et al.
(Continued)

FOREIGN PATENT DOCUMENTS

EP 0 917 304 5/1999
(Continued)

OTHER PUBLICATIONS

Tamvaclis C: 'QOS Driven Routing in Packet Switched Networks of Multiple Transmission Media' Agard Conference Proceedings, Neuilly Sur Seine, FR, Oct. 4, 1993, pp. 2-1 to 2-8, XP002067511 ISSN: 0549-7191.

*Primary Examiner* — Kiet Doan
(74) *Attorney, Agent, or Firm* — Jones Day (57) ABSTRACT

A method is performed by a wireless device. The method includes (a) preselecting a set of the base stations; (b) selecting a reverse link cost according to a preselected reverse link cost metric; (c) selecting a base station from the set of base stations; and (d) sending a probe signal at the selected reverse link cost to the selected base station. If a response is not received from the selected base station within a preselected time period and not all the base stations have been sent a probe signal at substantially the selected reverse link cost, then steps (c) through (d) are repeated with a different one of the base stations at substantially the selected reverse link cost. If a response is received from the selected base station within the timeout period, then the responding base station is selected to provide access to the wireless network.

20 Claims, 9 Drawing Sheets

U.S. PATENT DOCUMENTS

| | | | |
|---|---|---|---|
| 5,960,347 | A | 9/1999 | Ozluturk |
| 6,038,448 | A | 3/2000 | Chheda et al. |
| 6,058,107 | A | 5/2000 | Love et al. |
| 6,097,954 | A | 8/2000 | Kumar et al. |
| 6,590,881 | B1 | 7/2003 | Wallace et al. |
| 6,631,123 | B1 * | 10/2003 | Jiang et al. ............. 370/335 |
| 6,661,853 | B1 | 12/2003 | Agami et al. |
| 6,754,501 | B1 * | 6/2004 | McRae et al. ............ 455/453 |
| 6,781,969 | B2 | 8/2004 | Nikides et al. |
| 6,788,937 | B1 | 9/2004 | Willenegger et al. |
| 6,987,973 | B2 * | 1/2006 | Wawrzynski et al. ........ 455/450 |
| 7,133,380 | B1 * | 11/2006 | Winters et al. ............ 370/329 |
| 2001/0022806 | A1 * | 9/2001 | Adachi ..................... 375/133 |
| 2002/0034948 | A1 * | 3/2002 | Yamagiwa ................. 455/437 |
| 2002/0167907 | A1 | 11/2002 | Sarkar et al. |
| 2003/0086405 | A1 * | 5/2003 | Silva et al. ............... 370/342 |

FOREIGN PATENT DOCUMENTS

| | | |
|---|---|---|
| WO | 00/65863 A1 | 11/2000 |
| WO | 01/26411 A1 | 4/2001 |

\* cited by examiner

METHOD OF SYSTEM ACCESS TO A WIRELESS NETWORK

CROSS-REFERENCE TO RELATED APPLICATIONS

This is a continuation of U.S. application Ser. No. 12/715,001, filed Mar. 1, 2010, which is a continuation of U.S. application Ser. No. 11/607,578, filed Dec. 1, 2006 (now U.S. Pat. No. 7,702,335), which is a continuation of U.S. application Ser. No. 10/498,025, filed Jun. 4, 2004 (now U.S. Pat. No. 7,162,242), which was the National Stage of International Application No. PCT/CA02/01944, filed Dec. 6, 2002, which claims benefit of U.S. Provisional Application No. 60/336,687, filed Dec. 7, 2001, all of the above applications hereby incorporated herein by reference.

BACKGROUND

1. Technical Field

This invention relates generally to a method for system access in wireless networks. More particularly, the invention provides a method that may be practiced at a wireless device for accessing a wireless network in a way that conserves a link cost at the wireless device. The invention is particularly well suited for use in Personal Digital Assistants, mobile communication devices, cellular phones, and wireless two-way communication devices (collectively referred to herein as wireless devices"). The invention provides utility, however, in any device or system that accesses a wireless network.

2. Description of Related Art

Techniques for accessing wireless networks are known. One such access technique is used in current CDMA (Code Division Multiple Access) networks. In a typical access technique, a wireless device probes a base station at a given power level. If the base station does not respond, subsequent probes are sent to the same base station, typically escalating in power level, until either a response is received from the base station, or the wireless device declares an access failure.

SUMMARY

A method of system access from a communication device to a wireless network having a plurality of base stations includes the steps of determining a forward link quality for each of the plurality of base stations, ranking the plurality of base stations according to the forward link qualities for each of the base stations to obtain base station ranks, selecting a reverse link cost metric, determining a reverse link cost according to the selected reverse link cost metric, and incrementing through the base station ranks and for each base station rank selecting a base station and transmitting a probe signal based on the reverse link cost from the communication device to the selected base station until a response is received from a selected base station.

DETAILED DESCRIPTION

Throughout the drawings, the same or similar reference numerals are applied to the same or similar parts, elements or steps, and thus the description of the same or similar parts, elements or steps will be omitted or simplified when possible.

Figure 1:
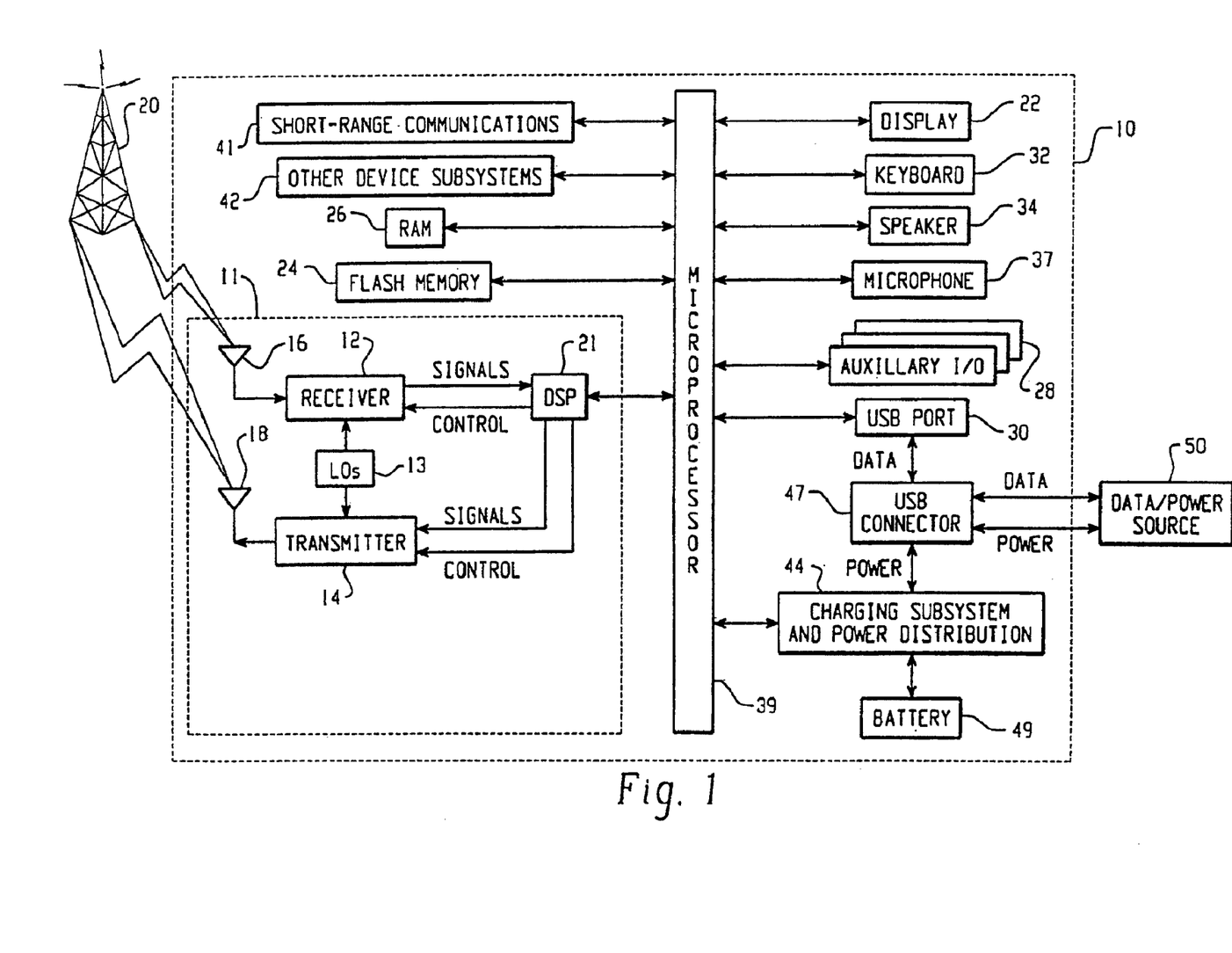
FIG. 1 is a block diagram of an exemplary wireless device for use in a method of system access to a wireless network.

FIG. 1 is a block diagram of a wireless device 10. The wireless device 10 is preferably a two-way communication device having at least voice or data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 10 is enabled for two-way communications, the device will incorporate a communication subsystem 11, including a receiver 12, a transmitter 14, and associated components such as one or more, preferably embedded or internal, antenna elements 16 and 18, local oscillators (LOs) 13, and a processing module such as a digital signal processor (DSP) 21. As will be apparent to those skilled in the field of communications, the particular design of the communication subsystem 11 will be dependent upon the communication network in which the device is intended to operate. For example, a device 10 destined for a North American market may include a communication subsystem 11 designed to operate within the Mobitex™ mobile communication system, DataTAC™ mobile communication system or Code Division Multiple Access (CDMA) communication system, whereas a device 10 intended for use in Europe may incorporate a General Packet Radio Service (GPRS) communication subsystem 11 or a Universal Mobile Telecommunication System (UMTS) communication subsystem 11.

Network access requirements will also vary depending upon the type of network 20. For example, in the Mobitex and DataTAC networks, mobile devices such as 10 are registered on the network using a unique identification number associated with each device. In GPRS networks, however, network access is associated with a subscriber or user of a device 10. A GPRS device requires a subscriber identity module, commonly referred to as a SIM card, in order to operate on a GPRS network. Without a SIM card, a GPRS device will not be fully functional. Local or non-network communication functions (if any) may be operable, but the device 10 will be unable to carry out any functions involving communications over network 20 other than '911' emergency calling or other legally required communication functions. When required network registration or activation procedures have been completed, a device 10 may send and receive communication signals over the network 20. Signals received by the antenna 16 through a communication network 20 are input to the receiver 12, which may perform such common receiver functions as signal amplification, frequency down conversion, filtering, channel selection and the like, and in the example system shown in FIG. 1, analog to digital conversion. Analog to digital conversion of a received signal allows more complex communication functions such as demodulation and decoding to be performed in the DSP 21. In a similar manner, signals to be transmitted by the device 10 are processed, including modulation and encoding for example, by the DSP 21 and input to the transmitter 14 for digital to analog conversion, frequency up conversion, filtering, amplification and transmission over the communication network 20 via the antenna 18.

The DSP 21 not only processes communication signals, but also provides for receiver and transmitter control. For example, the gains applied to communication signals in the receiver 12 and transmitter 14 may be adaptively controlled through automatic gain control algorithms implemented in the DSP 21.

The device 10 preferably includes a microprocessor 39 which controls the overall operation of the device. Communication functions, including at least data and voice communications, are performed through the communication subsystem 11. The microprocessor 39 also interacts with other device subsystems such as the display 22, flash memory 24, random access memory (RAM) 26, auxiliary input/output (I/O) subsystems 28, USB port 30, keyboard 32, speaker 34, microphone 37, a short-range communications subsystem 41, charging subsystem 44, battery 49 and any other device subsystems generally designated as 42. When the battery 49 eventually becomes depleted, power source 50 is used to charge battery 49, and optionally power device 10.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software used by the microprocessor 39 is preferably stored in a persistent store such as flash memory 24, which may instead be a read only memory (ROM) or similar storage element. Those skilled in the art will appreciate that the operating system, specific device applications, or parts thereof, may be temporarily loaded into a volatile store such as RAM 26. It is contemplated that received communication signals may also be stored to RAM 26.

The microprocessor 39, in addition to its operating system functions, preferably enables execution of software applications on the device. A predetermined set of applications which control basic device operations, including at least data and voice communication applications for example, will normally be installed on the device 10 during manufacture.

A preferred application that may be loaded onto the device 10 may be a personal information manager (PIM) application having the ability to organize and manage data items relating to the device user such as, but not limited to, e-mail, calendar events, voice mails, appointments, and task items. Naturally, one or more memory stores would be available on the device to facilitate storage of PIM data items on the device 10. Such PIM application would preferably have the ability to send and receive data items, via the wireless network. In one embodiment, the PIM data items are seamlessly integrated, synchronized and updated, via the wireless network, with the device user's corresponding data items stored or associated with a host computer system thereby creating a mirrored host computer on the mobile device with respect to the data items at least. This would be especially advantageous in the case where the host computer system is the mobile device user's office computer system.

Further applications may also be loaded onto the device 10 through the network 20, an auxiliary I/O subsystem 28, serial port 30, short-range communications subsystem 41 or any other suitable subsystem 42, and installed by a user in the RAM 26 or preferably in a non-volatile store 24 for execution by the microprocessor 39. Such flexibility in application installation increases the functionality of the device 10 and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 39, which will preferably further process the received signal for output to the display 22, or alternatively to an auxiliary I/O device 28. A user of device 10 may also compose data items, such as email messages, for example, using the keyboard 32, which is preferably a complete alphanumeric keyboard or telephone-type keypad, in conjunction with the display 22 and possibly an auxiliary I/O device 28. Such composed items may then be transmitted over a communication network through the communication subsystem 11.

For voice communications, overall operation of the device 10 is substantially similar, except that received signals would preferably be output to a speaker 34, and a microphone 37 would generate signals for transmission. Alternative voice or audio I/O subsystems, such as a voice message recording subsystem, may also be implemented on the device 10. Although voice or audio signal output is preferably accomplished primarily through the speaker 34, the display 22 may also be used to provide an indication of the identity of a calling party, the duration of a voice call, or other voice call related information for example.

A short-range communications subsystem 41 is a further optional component that may provide for communication between the device 10 and different systems or devices within close proximity to the device 10, which need not necessarily be similar devices. For example, the subsystem 41 may include an infrared device and associated circuits and components or a Bluetooth™ RF communication module to provide for communication with similarly-enabled systems and devices.

The USB port 30 in FIG. 1 is normally implemented in a personal digital assistant (PDA)-type communication device for which synchronization with a user's desktop computer may be desirable. Such a port 30 enables a user to set preferences through an external device or software application and to extend the capabilities of the device by providing for information or software downloads to the device 10 other than through a wireless communication network. The alternate download path may, for example, be used to load an encryption key onto the device through a direct and thus reliable and trusted connection to thereby enable secure device communication. Preferably, the data and power connector 47 is used to receive power and data from power/data source 50, directing the data to/from USB port 30, and the power to charging subsystem 44, so that charging subsystem 44 can recharge battery 49. Software on device 10 preferably reports charging status information to the user.

Many alternatives to device 10 may be implemented in the system and method disclosed herein. Preferably, an alternative to device 10 has at least a communication subsystem 11 in order to access network 20. Optionally, an alternative to device 10 may also have a battery 49 whose power may be conserved when implemented in the system and method disclosed herein.

Figure 2:
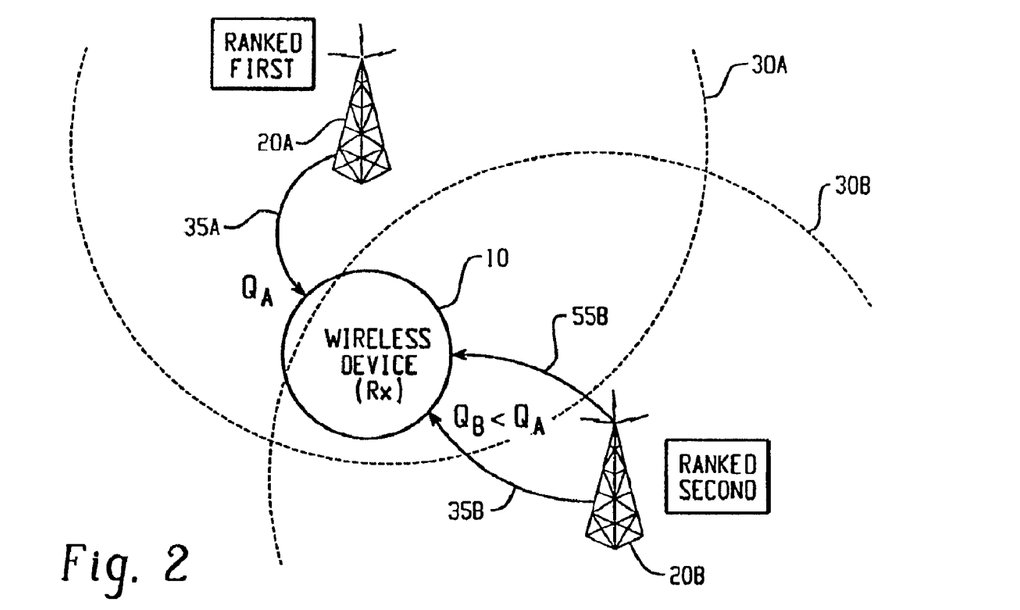
FIG. 2 illustrates forward channels and signals of two base stations and the wireless device of FIG. 1.
Figure 3:
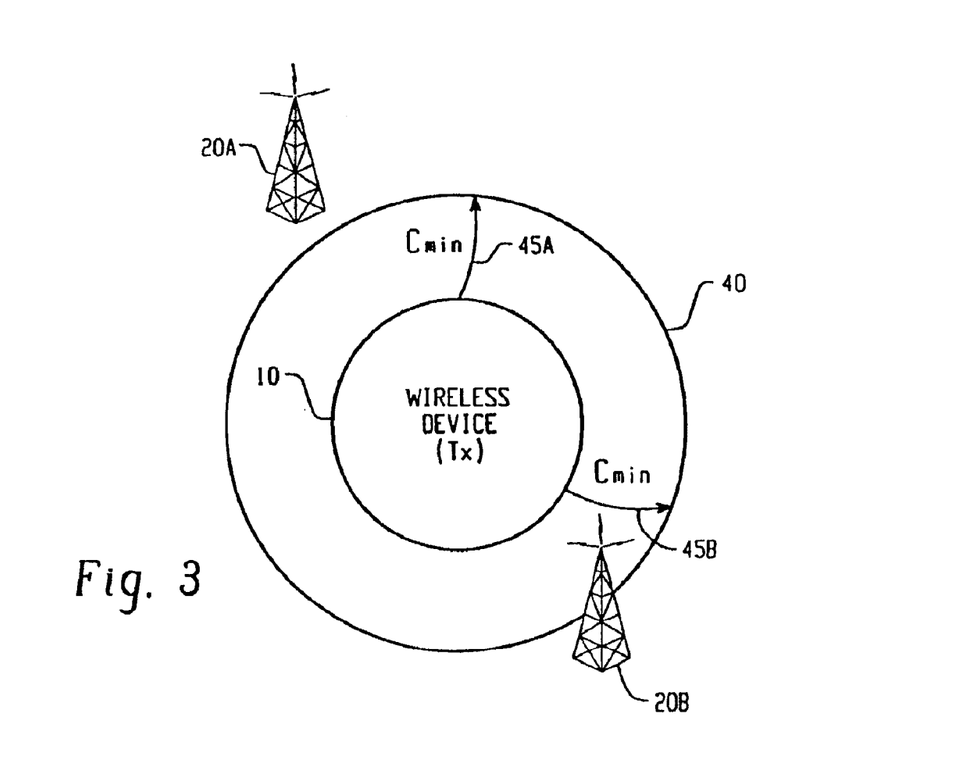
FIG. 3 illustrates reverse channels and signals of the wireless device of FIG. 1 and the two base stations of FIG. 2.

FIGS. 2 and 3 illustrate forward (up-link) and reverse (down-link) channels of a wireless device 10 accessing a wireless network via two base stations. FIG. 2 illustrates the forward channels whereas FIG. 3 illustrates the reverse channels.

Referring now to FIG. 2, a wireless device 10 is in communication with two base stations 20A, 20B, each having forward channels within range 30A, 30B of wireless device 10, respectively. Wireless device 10 receives signals 35A, 35B from base stations 20A, 20B, respectively. Signals 35A, 35B are assumed to be of sufficiently high quality $Q_A$, $Q_B$, respectively, to be received at wireless device 10. Base stations 20A, 20B are candidate base stations for the purpose of providing wireless device 10 system access to a wireless network.

Operationally, wireless device 10 compiles a list of candidate base stations 20A, 20B, by receiving signals 35A, 35B on the forward channels. For instance, the candidate base stations can be those in a "Neighbor List" obtained from a base station broadcast with a strong forward link quality.

Alternatively, the candidate base stations may include those base stations of a plurality of base stations whose forward link quality, for instance signal strength received at the wireless device 10, exceeds a certain threshold. The remaining bases stations are excluded base stations. These candidate base stations are then substituted for the plurality of base stations thereby reducing the cardinality of the plurality of base stations by the cardinality of the plurality of excluded base stations.

In FIG. 2, base stations 20A, 20B are disposed at a geometric distance relative to wireless device 10, which does not necessarily reflect physical distance between base stations 20A, 20B and wireless device 10. For instance, if signals 35A, 35B are sent over different frequency bands, use different coding or modulation, or are transmitted at different power levels, then base stations 20A, 20B may be illustrated at different geometric distances from wireless device 10 in FIG. 2. Geometric distance in FIG. 2 is inversely proportional to forward link quality.

The metric used by wireless device 10 to determine the forward link quality of signals 35A, 35B can be any forward channel characteristic that is significant to the type of signal received. For instance, signal strength can be used as one example of a forward link quality metric. Other metrics may be signal to noise ratio, symbol quality, base station load, or any combination of forward channel characteristics. The choice of forward link quality metric will impose a bias towards accessing a base station that has a high ranking according to the metric, as will be illustrated in greater detail below.

As shown in FIG. 2, the forward link quality QA of signal 35A is greater than the forward link quality $Q_B$ of signal 35B ($Q_B < Q_A$). Therefore, wireless device 10 ranks base station 20A first over base station 20B, which is ranked second. Consequently, wireless device 10 will preferably probe base station 20A before base station 20B.

Even though base station 20A is ranked first based on forward link quality, it may be base station 20B that responds 55B first to a probe (shown in FIG. 3) from the wireless device 10 and is used for accessing the wireless network. This is explained further in regard to FIG. 3, which illustrates the reverse channels.

Referring now to FIG. 3, wireless device 10 has knowledge of the two base stations 20A, 20B as a result of monitoring forward channel signals, as was described in reference to FIG. 2. Furthermore, wireless device 10 prefers probing base station 20A before base station 20B since base station 20A ranked first using a given forward link quality metric, i.e. $Q_A > Q_B$. The characteristics of reverse channels available to wireless device 10, however, may differ with the characteristics of forward channels, for instance due to different frequency bands, different coding, or modulation.

In FIG. 3, as in FIG. 2, base stations 20A, 20B are disposed at a geometric distance in the drawing relative to wireless device 10 that does not necessarily reflect physical distance between base stations 20A, 20B and wireless device 10. Geometric distance in FIG. 3 is inversely proportional to reverse link cost, whereas geometric distance was inversely proportional to forward signal quality in FIG. 2.

A preferred metric for reverse link cost is power consumption at the mobile device 10. Alternate metrics for reverse link cost may be used.

As illustrated in FIG. 3, only base station 20B is within the range 40 of probe signals 45A, 45B sent at reverse link cost Cmin, the minimum reverse link cost used in an access attempt by wireless device 10. Base station 20A is not within the range 40 of probe signals 45A, 45B. Hence, even if base station 20A is probed 45A first in FIG. 3, and base station 20B is probed 45B subsequently, base station 20B responds first 55B in FIG. 2 to probe 45B.

Thus, the wireless device 10 conserves energy while accessing the wireless network via base station 20B at the Cmin reverse link cost of probe 45B, as compared to accessing the wireless network via base station 20A at some reverse link cost greater than Cmin.

Having described the forward channels with reference to FIG. 2, and the reverse channels with reference to FIG. 3, a combined signal flow diagram is described next.

Figure 4:
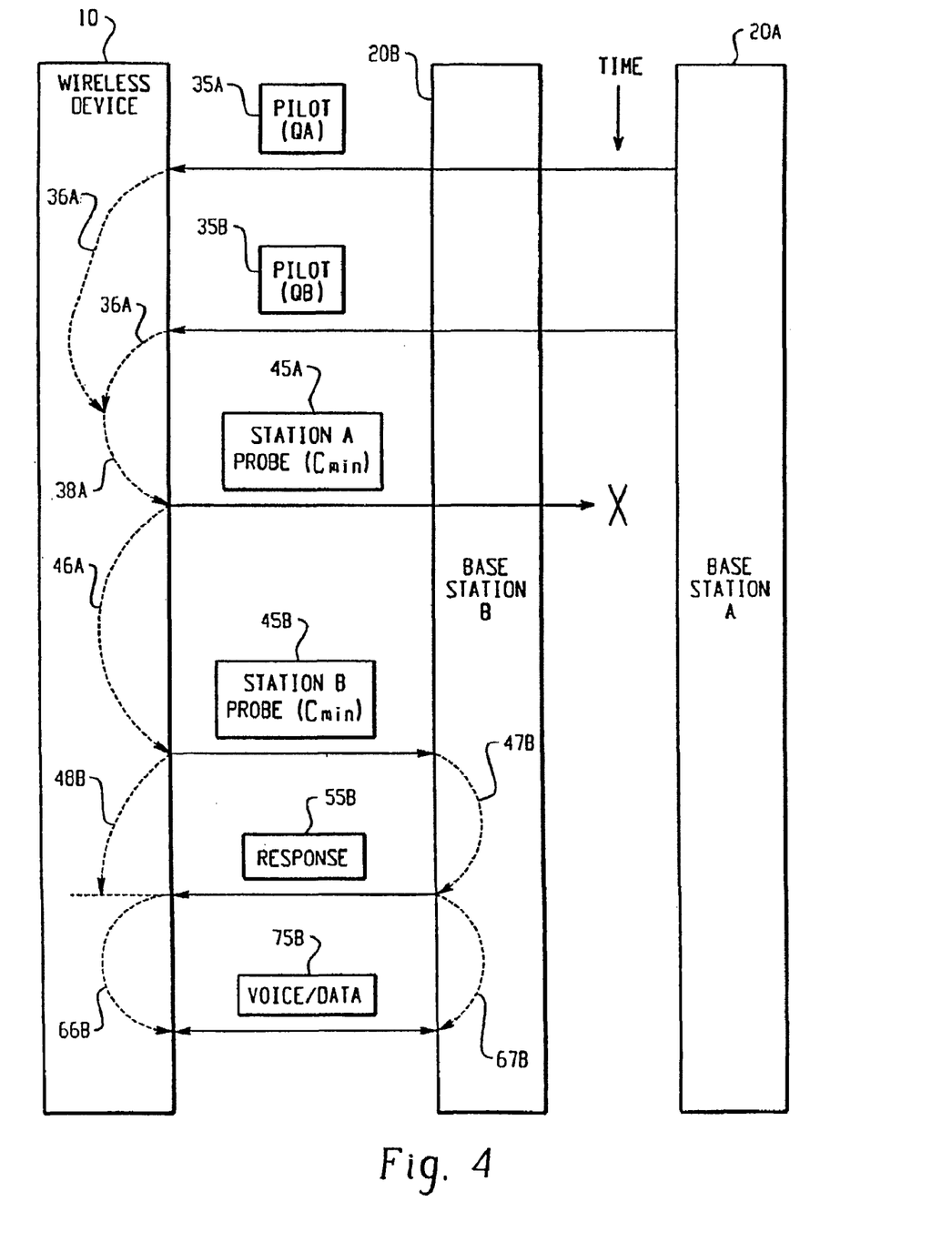
FIG. 4 is a signal flow diagram illustrating both forward and reverse channel signals of FIGS. 2 and 3.

FIG. 4 is a signal flow diagram illustrating both forward and reverse channel signals. The locations of the base stations 20A and 20B as shown in FIG. 4 are inversely proportional to reverse link cost, as in FIG. 3. As those skilled in the art will appreciate, signal lines passing through a block or component represent signals that either bypass or are not processed by that component. Therefore, signal 35A is sent to the device 10 by the base station 20A, but as will be apparent from FIGS. 2 and 3, the signal 35A is not received or processed by the base station 30B.

Wireless device 10 receives signals 35A, 35B over forward channels. Wireless device 10 compares 36A signals 35A, 35B from candidate base stations 20A, 20B in order to rank and select the highest ranked base station to probe. In the comparison 36A, the forward link quality of signals 35A, 35B received by wireless device 10 is determined using a given metric to determine which of candidate base stations 20A, 20B is ranked first and consequently probed first. Thus, the choice of forward link quality metric provides a bias towards a particular class of base station. For instance, if signal strength is the forward link quality metric, then base stations with a strong signal will be probed first. Alternatively, if the forward link quality metric is base station load, then base stations with low load will be probed first.

As was illustrated in FIG. 2 and described above, forward link quality $Q_A > Q_B$ so base station 20A is ranked first 38A. Consequently, wireless device 10 sends access probe 45A to base station 20A first at a minimum reverse link cost, Cmin.

As illustrated, probe 45A does not reach base station 20A. This may be because, in reference to FIG. 3, base station 20A is beyond the range 40 of probe 45A at reverse link cost Cmin. Wireless device 10 discovers this by waiting for a sufficiently long period of time that would have allowed base station 20A to respond to probe 45A, thereby resulting in a first timeout condition 46A. Instead of increasing reverse channel range by increasing reverse link cost and sending another probe to base station 20A, however, wireless device 10 then selects the next candidate base station 20B without increasing reverse link cost. Wireless device 10 sends access probe 45B at substantially the same minimum reverse link cost, Cmin, to base station 20B. Wireless device 10 waits, as indicated at 48B, for a second timeout condition to occur.

While wireless device 10 is waiting 48B for the second timeout condition to occur, base station 20B receives access probe 45B and prepares and sends 47B response 55B to wireless device 10. Before the second timeout condition occurs, wireless device 10 receives 66B response 55B. Base station 20B then provides access 67B so that voice and/or data communication 75B results between wireless device 10 and base station 20B, at reverse link cost Cmin of probe 45B. Thus, wireless device 10, although biased towards probing base station 20A first because of a high forward link quality, will trade-off forward link quality in favor of minimizing reverse link cost by accessing base station 20B.

Had base station 20B not responded before the second timeout condition occurred, wireless device 10 would have had sent at least one probe to all candidate base stations at the Cmin reverse link cost and the probes may have all timed out, in which case the wireless device 10 would have increased reverse link cost, and would have started a second round of probes at the increased reverse link cost, beginning with the highest ranked base station, 20A.

Accordingly, the wireless device 10 will only increase reverse link cost after having at least once probed all candidate base stations at the current reverse link cost, and after timeout conditions occurred on all probed candidate base stations at least once. This situation will be described in further detail with reference to FIGS. 5-8, wherein a plurality of base stations is considered.

Figure 5:
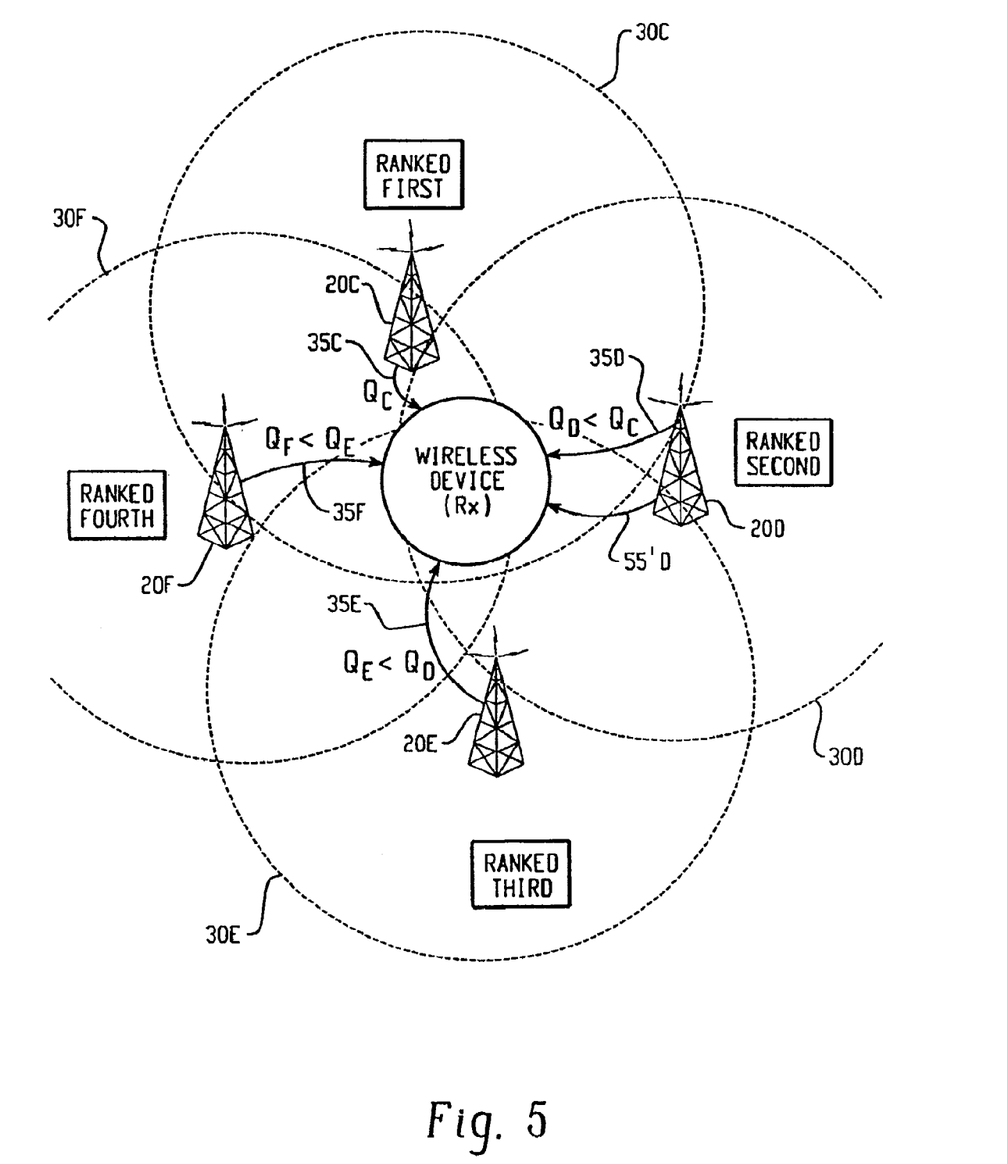
FIG. 5 illustrates forward channels and signals of four base stations and the wireless device of FIG. 1.
Figure 6:
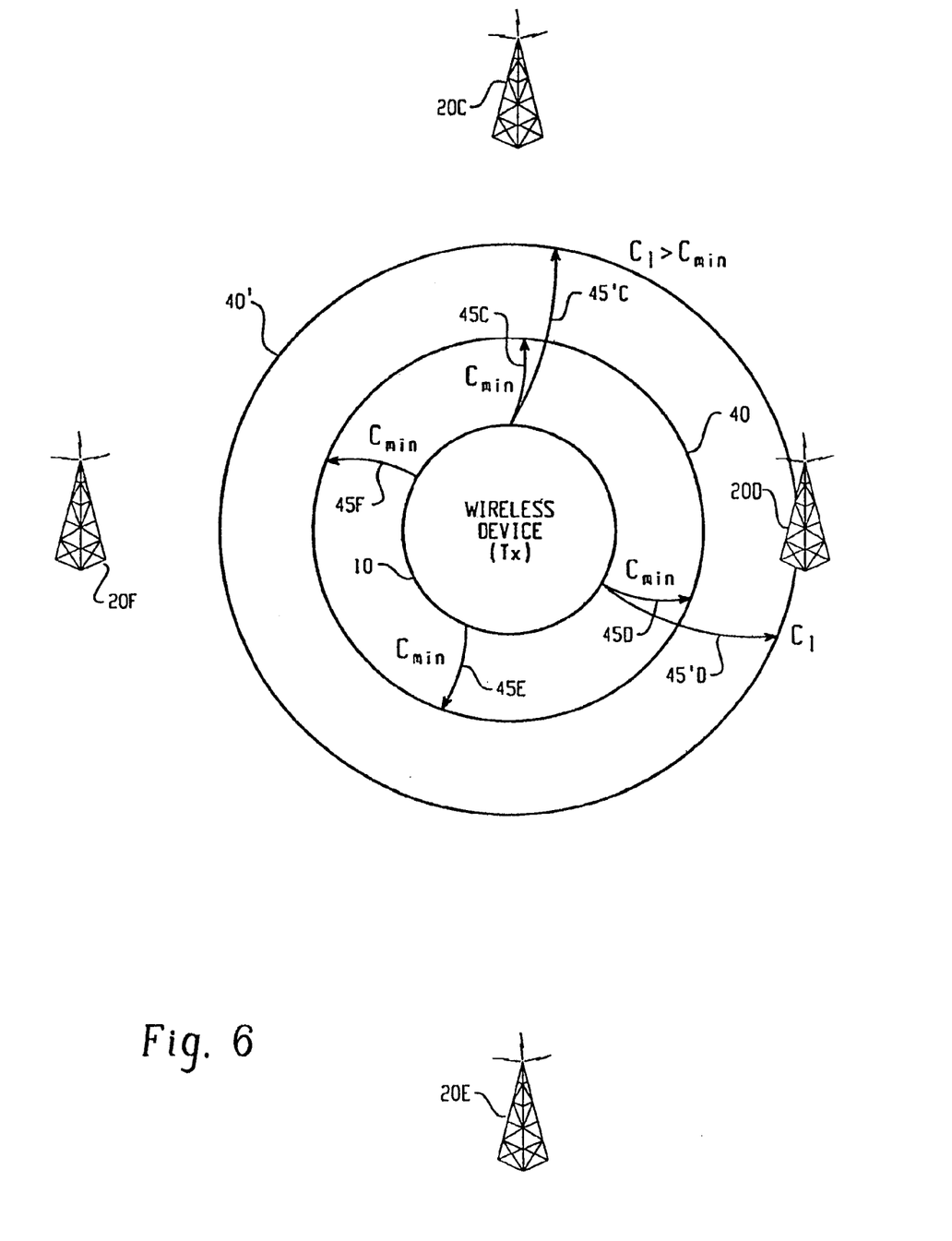
FIG. 6 illustrates reverse channels and signals of the wireless device of FIG. 1 and the four base stations of FIG. 5.

FIGS. 5 and 6 illustrate forward and reverse channels respectively of a wireless device 10 accessing a wireless network via four base stations. FIG. 5 illustrates the forward channels whereas FIG. 6 illustrates the reverse channels.

Referring now to FIG. 5, a wireless device 10 sees four base stations 20C, 20D, 20E and 20F each having forward channels within range 30C, 30D, 30E and 30F of wireless device 10. Wireless device 10 receives signals 35C, 35D, 35E and 35F from base stations 20C, 20D, 20E and 20F, respectively. Signals 35C, 35D, 35E and 35F are assumed to be of sufficiently high forward link quality $Q_C$, $Q_D$, $Q_E$ and $Q_F$, respectively, to be received at wireless device 10. As was the case with FIG. 2, geometric distance in FIG. 5 is inversely proportional to forward link quality.

As illustrated, the forward link quality $Q_C$ of signal 35C is greater than the quality $Q_D$ of signal 35D ($Q_D < Q_C$). Furthermore, as illustrated, $Q_F < Q_E < Q_D$. Therefore, wireless device 10 ranks the base stations accordingly: 20C is ranked first, followed by 20D, 20E and 20F. Consequently, wireless device 10 will preferably probe base station 20C before base station 20D, base station 20D before 20E, and base station 20E before 20F. This creates a bias towards accessing base stations with high forward signal quality.

Base station 20D responds 55'D first to a probe and is used for accessing the wireless network. This is explained further in regard to FIGS. 6-8, which illustrate the reverse channels and the process by which base station 20D responds 55'D first to the probe.

Referring now to FIG. 6, wireless device 10 has knowledge of four base stations 20C, 20D, 20E and 20F as a result of monitoring forward channel signals, as was described in reference to FIG. 5. Furthermore, wireless device 10 prefers probing base station 20C first because base station 20C ranked first using a given forward signal quality metric, i.e. $Q_C > Q_D > Q_E > Q_F$. The characteristics of reverse channels available to wireless device 10, however, may differ with the characteristics of forward channels. As was the case in FIG. 3, geometric distance in FIG. 6 is inversely proportional to reverse link cost.

Probe signals 45C, 45D, 45E, and 45F may be sent over different frequency bands, use different coding or modulation, or transmitted at different power levels. Signals 45C, 45D, 45E and 45F, however, are all sent at substantially the same reverse link cost, Cmin as illustrated by their common reverse channel range 40.

As illustrated, no base station is within the range 40 of probe signals 45C, 45D, 45E and 45F sent at reverse link cost Cmin. Wireless device 10, having sent at least one probe to all candidate base stations at the Cmin reverse link cost, increases reverse link cost to C1>Cmin, and starts a second round of probes beginning with the highest ranked base station 20C. As illustrated, base station 20D is within the range 40' at reverse link cost C1. Therefore base station 20D receives probe signal 45'D, and base station 20D responds first 55'D as shown in FIG. 5.

Figure 7:
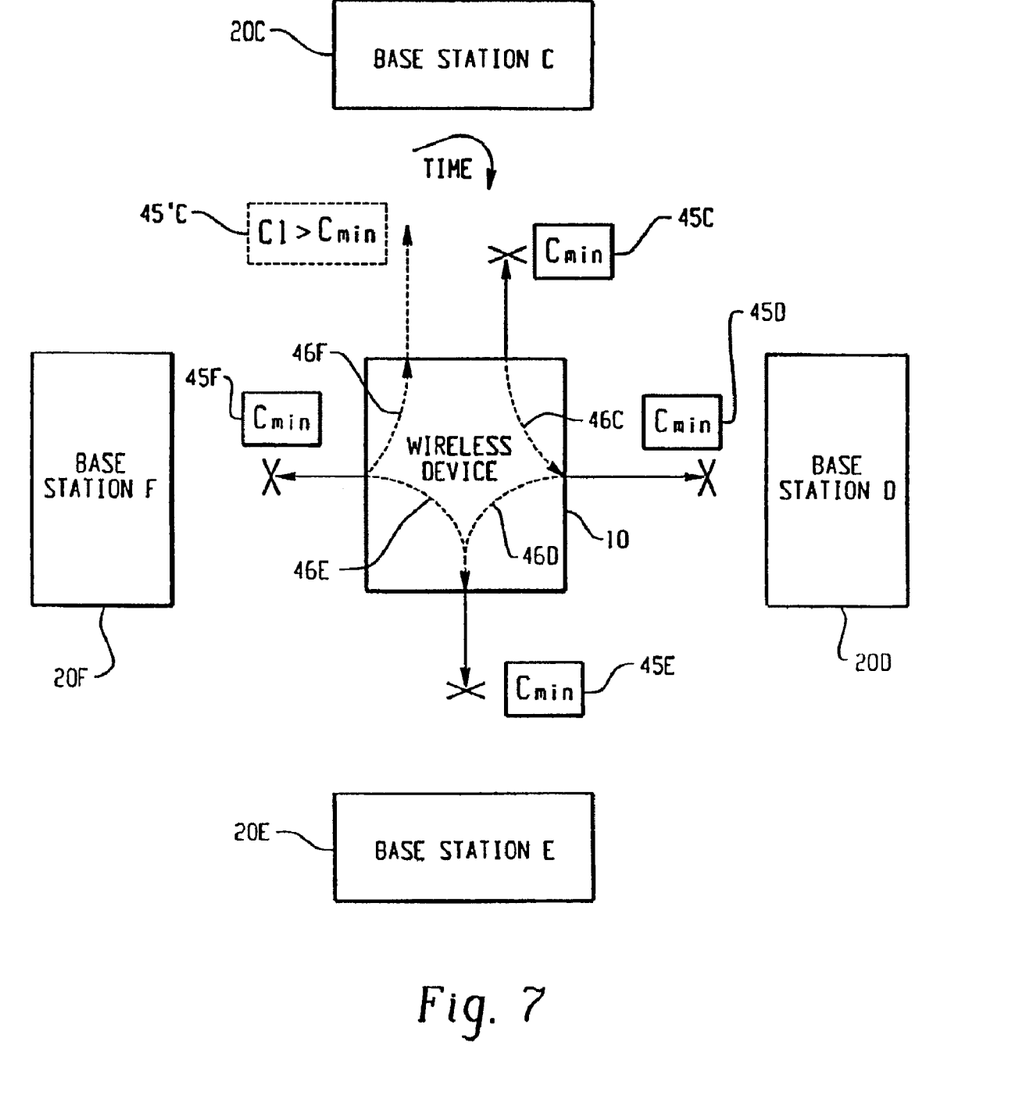
FIG. 7 is a signal flow diagram illustrating both forward and reverse channel signals of FIGS. 5 and 6 during a first turn at a first reverse quality.
Figure 8:
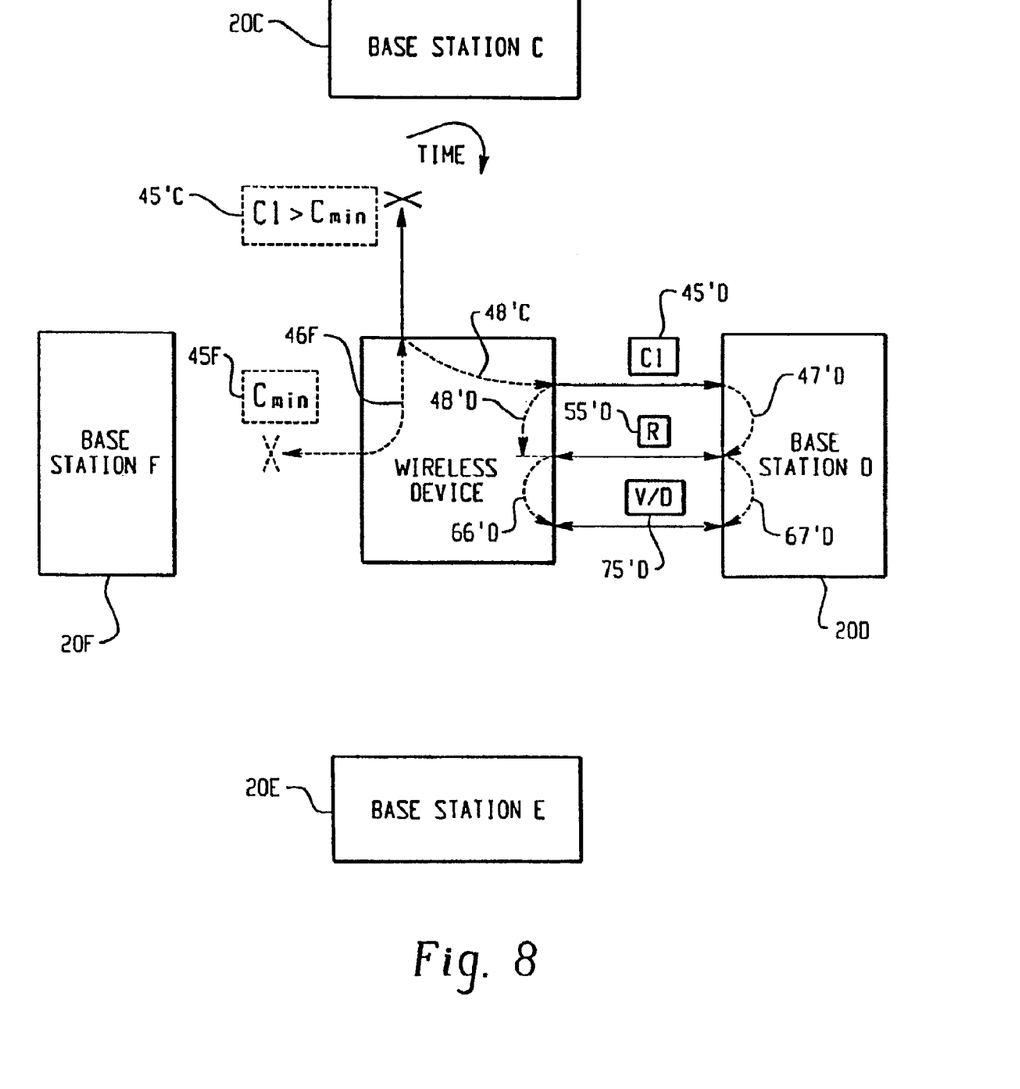
FIG. 8 is a signal flow diagram illustrating both forward and reverse channel signals of FIGS. 5 and 6 during a second turn at a second reverse quality.

FIGS. 7 and 8 are signal flow diagrams illustrating both forward and reverse channel signals. Time flows clockwise in both FIGS. 7 and 8. FIG. 7 illustrates in greater detail a first round of probes leading to an increase in reverse link cost whereas FIG. 8 illustrates in greater detail a second round of probes at an increased reverse link cost providing access to the wireless network.

Referring now to FIG. 7, as was illustrated in FIG. 5 and described above, $Q_C > Q_D > Q_E > Q_F$, so base station 20C is ranked first. Consequently, probe 45C is sent to base station 20C first at reverse link cost Cmin.

As illustrated, probe 45C does not reach base station 20C. Wireless device 10 waits for a sufficiently long period of time that would have allowed base station 20C to respond to probe 45C, and a first timeout condition 46C occurs. Wireless device 10 selects the next candidate base station 20D, to which it sends access probe 45D at substantially the same minimum reverse link cost, Cmin. Wireless device 10 waits for a second timeout condition 46D, which occurs. Wireless device 10 then selects the next candidate base station 20E, to which it sends access probe 45E at substantially the same minimum reverse link cost, Cmin. Wireless device 10 waits for a third timeout condition 46E, which occurs. Wireless device 10 then selects the next candidate base station 20F, to which it sends access probe 45F at substantially the same minimum reverse link cost, Cmin. Wireless device 10 then waits for a fourth timeout condition 46F, which occurs.

Having sent at least one probe 45C, 45D, 45E, 45F to all candidate base stations at the Cmin reverse link cost, wireless device 10 increases reverse link cost to C1>Cmin, and starts a second round of probes beginning again with the highest ranked base station 20C.

Referring now to FIG. 8, wireless device 10 sends access probe 45'C at reverse link cost C1>Cmin to base station 20C. Wireless device 10 waits for a fifth timeout condition 48'C, which occurs. Wireless device 10 selects the next candidate base station 20D, to which it sends access probe 45'D at substantially the same reverse link cost, C1. Wireless device 10 waits for a sixth timeout condition 48'D to occur. While wireless device 10 is waiting for the sixth timeout condition 48'D to occur, base station 20D receives 47'D probe 45'D and sends response 55'D to wireless device 10. Before the sixth timeout condition 48'D occurs, wireless device 10 receives 66'D response 55'D. Base Station 20D provides access 67'D, so voice and/or data communication 75'D results between wireless device 10 and base station 20D, at reverse link cost C1 of probe 45'D. Thus wireless device 10 is still biased towards maximizing forward link quality even after having to increase reverse link cost.

Figure 9:
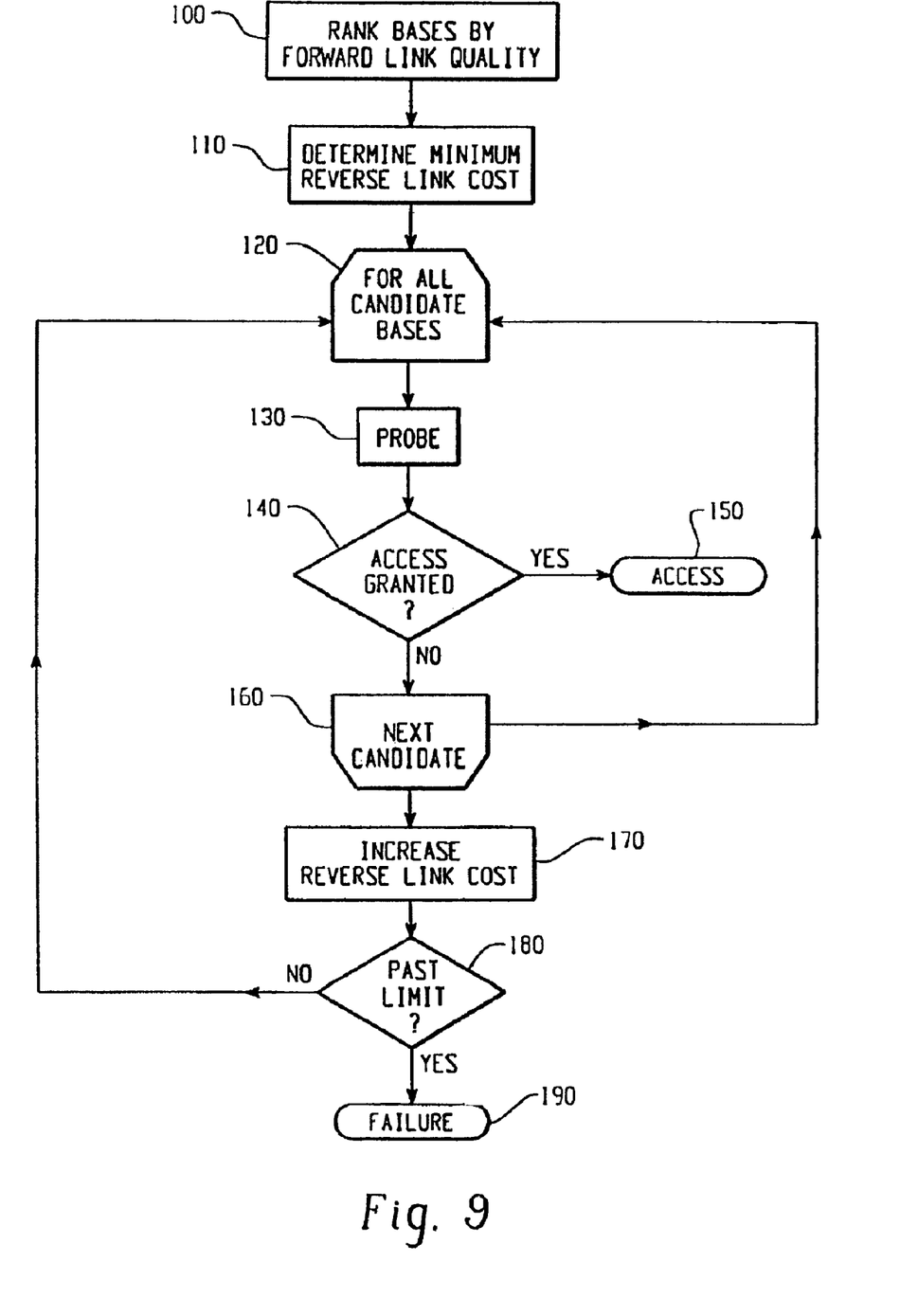
FIG. 9 is a flow chart illustrating one example of a method of system access to a wireless network.

Having described forward and reverse channels and signal flow diagrams by way of two examples in reference to FIGS. 2-4 and FIGS. 5-8, respectively, a flow chart illustrating the common steps involved in one embodiment of the method is described next. FIG. 9 is a flow chart showing an exemplary method of accessing a wireless network.

The method preferably probes all candidate base stations at a particular reverse link cost at least once before escalating the reverse link cost thereby ensuring that reverse link cost is minimized. Furthermore, the method preferably ranks candidate base stations according to forward signal quality thereby providing a bias towards maximizing forward signal quality that is not at the expense of the aforementioned minimization.

At step 100, wireless device 10 scans forward channels for a plurality of base stations, or alternatively obtains a "Neighbors List" from at least one forward channel. The plurality of base stations may be optionally partitioned into a plurality of candidate base stations and a plurality of excluded base stations to reduce the number of base stations to be processed. The plurality of base stations may also be preferably ranked according to forward link quality based on a metric selected from a list of predetermined forward signal quality metrics. The list of predetermined forward link quality metrics, in alternate embodiments, may include for example a power consumption metric, a signal strength metric, a coding complexity metric, a modulation type metric, a network subscriber access cost metric, a bandwidth metric, a throughput metric, a latency metric, a load metric, or a combination of predetermined forward link quality metrics. Other metrics may also be used. Illustratively, if a signal strength metric is used, a base station with a high signal strength will have a higher forward link quality that a base station with a low signal strength.

The value of a metric may be determined at the wireless device 10 or provided by the base station, depending on the metric. For example, if the metric is a signal strength metric, the value may be determined at the wireless device 10. Alternatively, if the metric is a load metric of a base station, the value may be provided by the base station in response to the probe signal from the wireless device 10.

At step 110, wireless device 10 determines a minimum reverse link cost, Cmin, which is used as the current reverse link cost C. Preferably, Cmin is determined as a function of the highest ranked forward link quality, as a higher forward link quality yields a lower Cmin. As previously described, the reverse link cost can be, for example, based on the metric of power consumption at the wireless device 10. Preferably, the reverse link cost is determined based on a reverse link cost metric selected from a list of predetermined reverse link cost metrics. The list of predetermined reverse link cost metrics, in alternate embodiments, may include, for example, a power consumption metric, a transmitted power metric, an interference level metric, a coding type metric, a modulation type metric, a network subscriber access cost metric, a bandwidth metric, a throughput metric, a latency metric, a load metric, or a combination of predetermined reverse link cost metrics. Other metrics may also be used.

If base stations are ranked or otherwise biased in favor of selecting high forward link quality base stations first, then at step 120, candidate base stations that are higher ranked are probed first. This bias maximizes forward signal quality without increasing reverse link cost. In alternate embodiments, the candidate base stations can be ranked in a pseudo-random manner without regard to forward signal quality, or optionally not necessarily ranked so long as a bias is maintained in selecting a candidate base station to favor a base station which has a high forward link quality relative to the plurality of base stations according to the selected forward link quality metric At step 120, the candidate base stations obtained at step 100 are successively considered in turn. If the base stations are ranked or otherwise biased by order determined by a rank index, such as such as by decreasing forward link quality, the candidate base stations may be successively considered according to the rank index. Selected base station are probed at step 130 and monitored at step 140, until either all base stations are processed at step 160, or until access is granted at step 150.

Probing according to high forward link quality first favors access to base stations which rank highest according to the selected forward link quality metric, such as for example base stations with high forward signal strength. This is done without increasing reverse link cost. The ranking preferably occurs on the basis of a forward link quality metric selected from a list of predetermined forward link quality metrics.

At step 130, the current candidate base station is sent a probe over the reverse channel at the current reverse link cost C, which was first determined at step 110, and which may have been increased in subsequent turns at step 170. This ensures that reverse link cost is minimized as all base stations are processed at the current reverse link cost before increasing reverse link cost.

At step 140, the current candidate base station is monitored over the forward channel for a response to the probe sent at step 130. If a response is received within a timeout period, then access to the network ensues over the current candidate base station at step 150. If a response is not received within the timeout period, however, then step 160 verifies if all candidate base stations have been processed in this turn at the current reverse link cost. In alternate embodiments, more than one probe signal can be sent to more than one candidate base station so that the timeout periods for two or more base stations may be contemporaneous and multiple base stations are monitored simultaneously for response thereby improving network system access time.

At step 160, if all candidate base stations have been processed in this turn at the current reverse link cost, then step 170 follows, and the reverse link cost C is increased. If not all candidate base stations have been processed at the current reverse link cost, however, then the next base station in the rank order is selected as the current base station at step 120.

At step 170, the current reverse link cost C is increased according to a given metric for reverse link cost, for instance by augmenting transmit power, channel coding, or both.

At step 180, if the current reverse link cost C has past a certain predefined limit, for instance the capacity of wireless device 10, then access failure is declared at step 190. If the current reverse link cost C is still within limits, then another turn ensues at step 120, whereat another current candidate base station is selected, however, beginning with the highest ranked, and the processing in steps 130 through 180 is repeated at the increased reverse link cost.

At step 190, all candidate base stations have been probed at least once at the maximum reverse link cost, so an access failure is declared. Preferably the wireless device 10 then scans for alternate candidate base stations.

In an alternate embodiment, more than one access probe may be sent to a candidate base station at substantially the same reverse link cost before the next candidate base station is probed.

Figure 10:
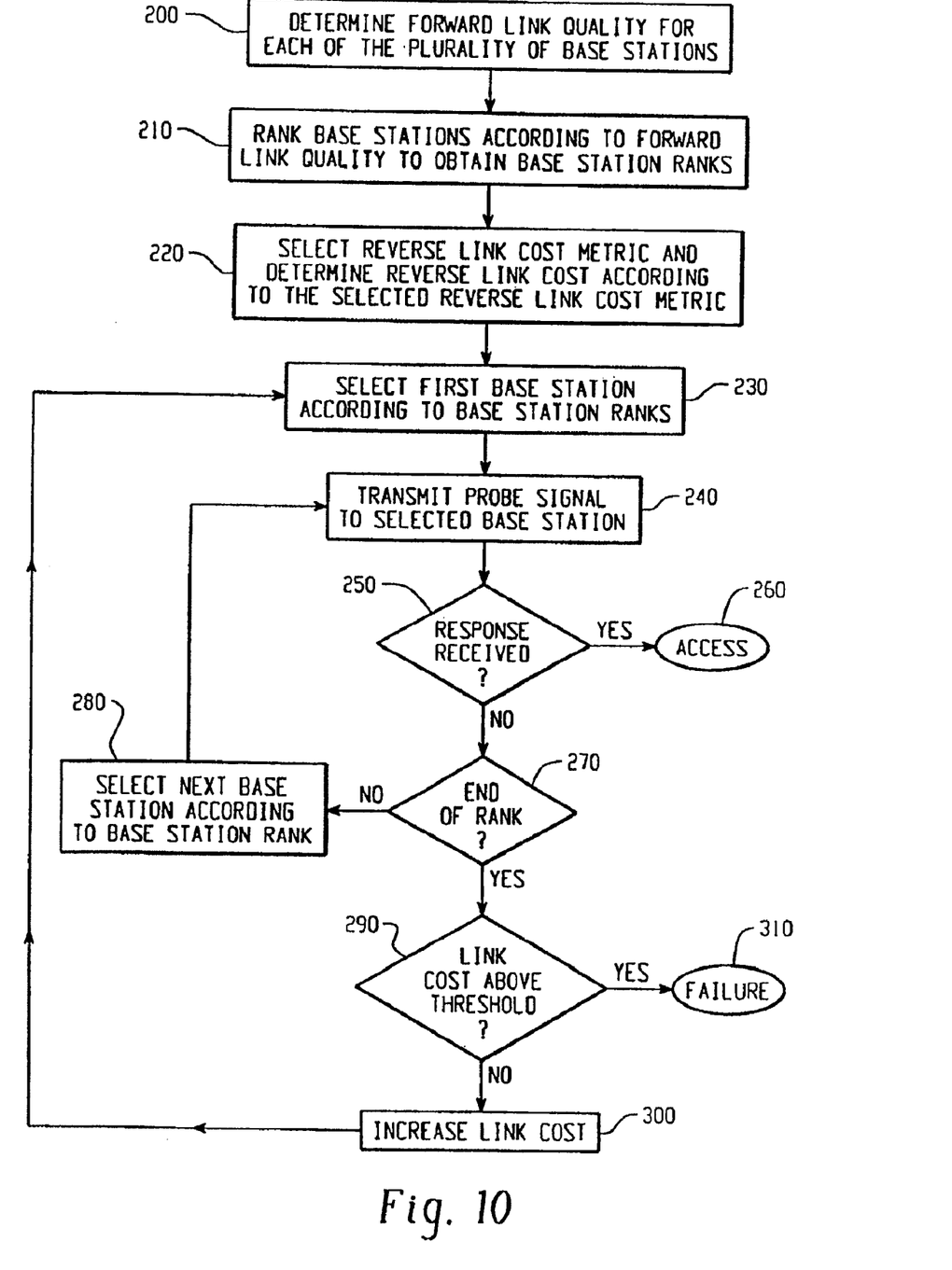
FIG. 10 is a flow chart illustrating another example of a method of system access to a wireless network.

FIG. 10 provides a flow chart illustrating another example of a method of system access to a wireless network. In step 200, the wireless communication device 10 determines a forward link quality for each of a plurality of base stations.

In step 210, the base stations are ranked according to the forward link quality of each base station to obtain base station ranks. Thus, the base station with the higher signal strength will be ranked higher than the base station with the lower signal strength.

In step 220, the wireless communication device 10 selects a reverse link cost metric and determines a reverse link cost according to the selected reverse link cost metric.

In step 230, a base station corresponding to the first base station rank is selected, and in step 240 the wireless communication device 10 transmits a probe signal to the selected base station based on the reverse link cost.

In step 250, the wireless communication device 10 determines if a response is received from the selected base station in response to the reverse link cost probe. The wireless communication device 10 may determine whether a response is received by one or more measurement criteria. For example, the received response may be required to exceed a signal to noise ratio, or may be required to be received within a timeout period. If the received response does not meet the measurement criteria, then the wireless communication device 10 will deem that no signal is received.

If a response is received, then access to the network ensues, as shown in step 260. If no response is received, then the wireless communication device 10 determines if it has reached the end of the base station rank in step 270. If the end of the base station rank has not been reached, then the next base station in the base station rank is selected in step 280, and steps 240-280 are repeated accordingly. If the end of the base station rank has been reached, however, then the wireless communication device 10 determines if the reverse link cost exceeds a threshold limit in step 290. If the reverse link cost does not exceed the threshold limit, then the reverse link cost is increased in step 300, and steps 230-290 are repeated accordingly. If the reverse link cost does exceed the threshold limit, then the wireless communication device 10 determines that there is a failure to establish communication with the wireless network.

The embodiments described herein are examples of structures, systems or methods having elements corresponding to elements of the invention. This written description may enable those skilled in the art to make and use embodiments having alternative elements that likewise correspond to the elements of the invention. The intended scope of the invention thus includes other structures, systems or methods that do not differ from the invention as described herein, and further includes other structures, systems or methods with insubstantial differences from the invention as described here.

The invention claimed is:

1. A method performed by a wireless device for accessing a wireless network through network base stations, comprising:
   (a) selecting a reverse link cost according to an initial reverse link cost metric;
   (b) selecting a base station from a set of base stations;
   (c) sending a probe signal at the selected reverse link cost to the selected base station;
   (d) if a response is not received from the selected base station within a timeout period and not all the base stations have been sent a probe signal at substantially the selected reverse link cost, then repeating steps (b) through (c) with a different one of the base stations at substantially the selected reverse link cost; and
   (e) if a response is received from the selected base station within the timeout period, then selecting the responding base station to provide access to the wireless network.

2. The method of claim 1 wherein step (d) includes:
   if a response is not received from the selected base station within the timeout period and all the base stations have been sent a probe signal at substantially the selected reverse link cost, then increasing the selected reverse link cost and repeating steps (b) through (d).

3. The method of claim 1 wherein, in step (b), the selecting of a base station is in accordance with a base station ranking based on the base stations' respective power consumptions.

4. The method of claim 1 wherein, in step (b), the selecting of a base station is in accordance with a base station ranking based on the base stations' respective signal strengths.

5. The method of claim 1 wherein, in step (b), the selecting of a base station is in accordance with a base station ranking based on the base stations' respective coding complexities.

6. The method of claim 1 wherein, in step (b), the selecting of a base station is in accordance with a base station ranking based on the base stations' respective modulation types.

7. The method of claim 1 wherein, in step (b), the selecting of a base station is in accordance with a base station ranking based on the base stations' respective member subscriber access costs.

8. The method of claim 1 wherein, in step (b), the selecting of a base station is in accordance with a base station ranking based on the base stations' respective bandwidths.

9. The method of claim 1 wherein, in step (b), the selecting of a base station is in accordance with a base station ranking based on the base stations' respective throughput.

10. The method of claim 1 wherein, in step (b), the selecting of a base station is in accordance with a base station ranking based on the base stations' respective latencies.

11. The method of claim 1 wherein, in step (b), the selecting of a base station is in accordance with a base station ranking based on the base stations' respective loads.

12. The method of claim 1 wherein, in step (b), the selecting of a base station is in accordance with a base station ranking based on forward link quality values, for the respective base stations, that are determined by the wireless device.

13. The method of claim 1 wherein, in step (b), the selecting of a base station is in accordance with a base station ranking based on forward link quality values, for the respective base stations, that are provided to the mobile device by each respective base station.

14. The method of claim 1 wherein the initial reverse link cost metric is power consumption by the mobile device.

15. The method of claim 1 wherein the initial reverse link cost metric is transmitted power by the mobile device.

16. The method of claim 1 wherein the initial reverse link cost metric is interference level at the mobile device.

17. The method of claim 1 wherein the initial reverse link cost metric is coding type by the mobile device.

18. The method of claim 1 wherein the initial reverse link cost metric is modulation type by the mobile device.

19. The method of claim 1 wherein the initial reverse link cost metric is network subscriber access cost by the mobile device.

20. The method of claim 1 wherein the initial reverse link cost metric is throughput by the mobile device.

* * * * *